US009509795B2

(12) United States Patent
MacInnis et al.

(10) Patent No.: US 9,509,795 B2
(45) Date of Patent: *Nov. 29, 2016

(54) METHOD AND SYSTEM FOR TAGGING DATA WITH CONTEXT DATA TAGS IN A WIRELESS SYSTEM

(75) Inventors: Alexander G. MacInnis, Ann Arbor, MI (US); Thomas Quigley, Franklin, NC (US); Arya Behzad, Poway, CA (US); Jeyhan Karaoguz, Irvine, CA (US); John Walley, Ladera Ranch, CA (US); Mark Buer, Gilbert, AZ (US)

(73) Assignee: Broadcom Corporation, Irvine, CA (US)

( * ) Notice: Subject to any disclaimer, the term of this patent is extended or adjusted under 35 U.S.C. 154(b) by 2385 days.

This patent is subject to a terminal disclaimer.

(21) Appl. No.: 11/864,202

(22) Filed: Sep. 28, 2007

(65) Prior Publication Data

US 2009/0023432 A1     Jan. 22, 2009

Related U.S. Application Data

(60) Provisional application No. 60/950,978, filed on Jul. 20, 2007.

(51) Int. Cl.
| | | |
|---|---|---|
| H04M 3/00 | (2006.01) | |
| H04L 29/08 | (2006.01) | |
| G06F 17/30 | (2006.01) | |
| H04W 8/18 | (2009.01) | |

(52) U.S. Cl.
CPC ....... *H04L 67/306* (2013.01); *G06F 17/30035* (2013.01); *G06F 17/30038* (2013.01); *H04L 67/28* (2013.01); *H04W 8/18* (2013.01)

(58) Field of Classification Search
CPC ............................ H04L 67/306; H04W 12/06
USPC ........ 455/456.1, 39, 418, 412.1, 414.3, 558, 455/466, 41.2, 41.1, 556.1, 73; 348/211.99; 370/310.2; 386/241
See application file for complete search history.

(56) References Cited

U.S. PATENT DOCUMENTS 8,150,416 B2 *   4/2012  Ribaudo et al. ........... 455/456.1
2002/0069218 A1   6/2002  Sull et al.
(Continued)

FOREIGN PATENT DOCUMENTS

| CN | 1846209 | 10/2006 |
|---|---|---|
| KR | 2005-0070152 | 7/2005 |
| WO | WO2007/062254 A2 | 5/2007 |

OTHER PUBLICATIONS

Seagate Technology LLC, Seagate D.A.V.E. (Digital Audio Video Experience) Transform the consumer digital content experience with the Seagate D.A.V.E. design concept, Data Sheet, 2007.
(Continued)

*Primary Examiner* — Kiet Doan
(74) *Attorney, Agent, or Firm* — Oblon, McClelland, Maier & Neustadt, L.L.P.

(57) ABSTRACT

A wireless mobile communication (WMC) device may be utilized to generate and/or maintain multimedia data files. Context data tags may be created to tag the generated multimedia data files, enabling identification of multimedia data files without directly accessing the contents of the multimedia data files. Context data tags may comprise such attributes as time/date stamps, location, subject, environment, scheduling, and/or biometric information. The WMC device may maintain user preference information, which is unique to the WMC device capabilities and/or to a specific device user. The user preference information may be utilized to specify attributes that may be utilized in creating context data tags for multimedia data files. The user preference information may be maintained in the WMC device and/or externally. Tagging operation may be performed dynamically, and a remote device may be utilized to perform tagging operations and/or to maintain the user preference information.

26 Claims, 5 Drawing Sheets

(56) References Cited

U.S. PATENT DOCUMENTS

| | | |
|---|---|---|
| 2003/0154293 A1 | 8/2003 | Zmolek |
| 2004/0208343 A1 | 10/2004 | Golden et al. |
| 2005/0114357 A1 | 5/2005 | Chengalvarayan |
| 2005/0242921 A1 | 11/2005 | Zimmerman et al. |
| 2005/0289469 A1 | 12/2005 | Chandler et al. |
| 2006/0110012 A1* | 5/2006 | Ritter .................. 382/115 |
| 2006/0240862 A1 | 10/2006 | Neven et al. |
| 2007/0027911 A1 | 2/2007 | Hakala et al. |
| 2008/0194270 A1* | 8/2008 | Greenberg ............ 455/456.1 |

OTHER PUBLICATIONS

Seagate Technology LLC, Seagate D.A.V.E. (Digital Audio Video Experience) The portable storage platform that collects, plays and manages digital content, Product Overview, 2007.

European Search Report corresponding to European Application Serial No. 08010380.7-2413, mailed Nov. 28, 2008.

European Patent Office, Communication pursuant to Article 94(3) EPC, in Application No. 08 010 380.7, dated Jul. 28, 2011.

Office Action mailed Oct. 12, 2012, in Taiwanese Patent Application No. 097127616.

Office Action mailed Jan. 28, 2013, in Taiwanese Patent Application No. 097127616.

Office Action mailed Jun. 11, 2013, in Taiwanese Patent Application No. 097127616.

Office Action issued Sep. 11, 2014, in European Patent Application No. 08 010 380.7.

Office Action issued Mar. 18, 2016 in European Patent Application No. 08 010 380.7.

* cited by examiner

METHOD AND SYSTEM FOR TAGGING DATA WITH CONTEXT DATA TAGS IN A WIRELESS SYSTEM

CROSS-REFERENCE TO RELATED APPLICATIONS/INCORPORATION BY REFERENCE

This patent application makes reference to, claims priority to and claims benefit from U.S. Provisional Application Ser. No. 60/950,978 filed on Jul. 20, 2007.

The above stated application is hereby incorporated herein by reference in its entirety.

FIELD OF THE INVENTION

Certain embodiments of the invention relate to wireless devices. More specifically, certain embodiments of the invention relate to a method and system for tagging data with context data tags in a wireless system.

BACKGROUND OF THE INVENTION

The field of wireless communication has seen dramatic growth the last few years. In today's world, most people use their wireless devices for various purposes, business and personal, on a constant and daily basis. Society is truly becoming a wireless one. A lot of wireless solutions have been introduced, and have made tremendous strides into everyday's life.

For example, the use of Wireless Personal Area Networks (WPAN) has been gaining popularity in a great number of applications because of the flexibility and convenience in connectivity they provide. WPAN systems generally replace cumbersome cabling and/or wiring used to connect peripheral devices and/or mobile terminals by providing short distance wireless links that allow connectivity within very narrow spatial limits (typically, a 10-meter range). WPAN may be based on standardized technologies, for example Class 2 Bluetooth (BT) technology. While WPAN may be very beneficial for certain applications, other applications may require larger service areas and/or capabilities.

To satisfy such needs, other technologies have been developed to provide greater wireless service. Wireless Local Area Networks (WLAN) systems may operate within a 100-meter range, for example. In contrast to the WPAN systems, WLAN provide connectivity to devices that are located within a slightly larger geographical area, such as the area covered by a building or a campus, for example. WLAN systems are generally based on specific standards, for example IEEE 802.11 standard specifications, and typically operate within a 100-meter range, and are generally utilized to supplement the communication capacity provided by traditional wired Local Area Networks (LANs) installed in the same geographic area as the WLAN system.

Other forms of wireless solutions have evolved from traditional land-based communication technologies. For example, cellular phones have become just about an absolute necessity in today's world. While cellular technology was merely intended to add an element of mobility to the traditional telephony service, this technology has grown beyond that initial purpose. Many modern cellular technologies, including such technologies as GSM/GPRS/EDGE, UMTS, and CDMA2000, incorporate substantial data capabilities. Most of today's cellular services comprise such features as text messaging, audio/video streaming, and web browsing.

Some WLAN systems may be operated in conjunction with WPAN systems to provide users with an enhanced overall functionality. For example, Bluetooth technology may be utilized to connect a laptop computer or a handheld wireless terminal to a peripheral device, such as a keyboard, mouse, headphone, and/or printer, while the laptop computer or the handheld wireless terminal is also connected to a campus-wide WLAN network through an access point (AP) located within the building. Also, cellular technology may allow use of the mobile phone as a form of wireless modem that allows connecting a laptop, for example, to the internet via a cellular network.

Devices aimed at taking advantage of the capabilities of wireless networks may be described as wireless mobile communication (WMC) devices. Today's WMC devices may comprise such devices as cellular phones, PDA's, laptops, and/or other devices.

Most WMC devices nowadays offer more than simple communicative operations. These WMC devices, in addition to providing peer-to-peer communication functions, may allow their users expansive list of personal services and utilities. Some WMC devices may enable a broad scope of gaming, scheduling, task-organizational and/or other services. Additionally, more applications that traditionally were limited to non-wireless and/or non-mobile devices may be used in conjunction with WMC devices. For example, email applications such as Microsoft Outlook® are finding their way to more WMC devices. Other applications that have gained popularity in recent years comprise audio/video applications such as still and moving picture recording application and voice recording applications. These added capabilities and/or applications are slowly turning WMC devices into indispensable on-the-move personal assistants.

However, the promising potential of WMC devices' uses beyond simple communicative operations remains stagnant because of some limitations in the devices themselves, which may include such limitations as power, storage, and/or processing. Also, while a lot of work has been put into expanding WMC devices' potential utility, not a lot of work has been put into convening these new utilities for their users. For example, while the WMC devices offer impressive array of recording, organizing, and tracking services, very little effort has been made to facilitate convenient use of data.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for tagging data with context data tags in a wireless system, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for tagging data with context data tags in a wireless system. Wireless devices may be utilized to perform a plurality of jobs, and in doing so, the wireless devices may generate data. For example, a wireless mobile communication (WMC) device may be utilized to record a conversion or take a picture and/or capture a video clip. Subsequently, audio, video, and/or other types of multimedia data files may be generated. Various exemplary embodiments of the invention may enable capture and tagging of multimedia events with context based information. Context data tags may be created to tag the generated multimedia data files, enabling identification of multimedia data files without directly accessing the multimedia data files. Context data tags may comprise such attributes as time/date stamps, location, subject, environment, scheduling, and/or biometric information. User preference information may be utilized in creating context data tags. The user preference information may be utilized to specify attributes that may be utilized in creating context data tags for multimedia data files. The user preference information may be maintained in the WMC device and/or externally. Tagging operations may be performed dynamically, and a remote device may be utilized to perform tagging operations and/or to store user preference information.

Figure 1:
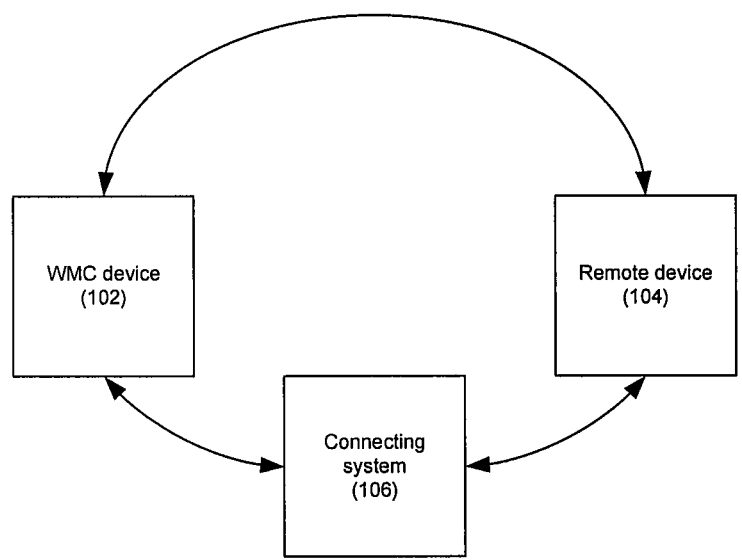
FIG. 1 is a block diagram that illustrates an exemplary communication setup between a wireless mobile communication (WMC) device and a remote device, which may utilize context data tags, in accordance with an embodiment of the invention.

FIG. 1 is a block diagram that illustrates an exemplary communication setup between a wireless mobile communication (WMC) device and a remote device, which may utilize context data tags, in accordance with an embodiment of the invention. Referring to FIG. 1, there is shown a wireless mobile communication (WMC) device 102, a remote device 104, and a connecting system 106.

The WMC device 102 may comprise suitable logic, circuitry and/or code that may enable performing wireless mobile communication. For example, the WMC device 102 may be utilized to perform voice, video and/or text message peer-to-peer communication. The WMC device 102 may also comprise suitable logic, circuitry and/or code that may enable performing additional functionality comprising Internet browsing, video streaming, and/or audio recording. For example, the WMC device 102 may comprise a digital camera that may enable generating sill pictures and/or video streams. Also, the WMC device 102 may comprise a microphone that may enable generating audio recordings.

The remote device 104 may comprise suitable logic, circuitry and/or code that may be enabled to communicate with the WMC device 102. The invention may not be limited to a specific remote device, but may comprise for example, a general purpose processing device, a specialized processing device, and/or a specialized peripheral device which may be enabled to perform various jobs and/or tasks that may be requested by the WMC device 102. For example, the remote device 104 may comprise a home PC that may be more capable of performing processing and/or storage operations than the WMC device 102 due to more powerful processing subsystems and/or increased memory space compared to the WMC device 102. Such home PC may be better suited to perform processing and/or storage intensive tasks that otherwise would have to be performed in the WMC device 102. For example, where necessary and/or feasible, the WMC device 102 may utilize the remote device 104 to perform tagging of data that may have been created and/or maintained in the WMC device 102.

The connecting system 106 may comprise a plurality of interconnecting networks and suitable logic, circuitry and/or code that may be enabled to facilitate end-to-end communication between the WMC device 102 and the remote device 104. The connecting system 106 may comprise wireless and/or wired networks that may be enabled to communicate and forward messaging and/or data between the WMC device 102 and the remote device 104. The connecting system 106 may be utilized to provide a transport and/or switching fabric that may facilitate communication between the WMC device 102 and the remote device 104.

In operation, the WMC device 102 may communicate with the remote device 104 through the connecting system 106, or alternatively, where possible, the WMC device 102 may communicate directly with the remote device 104.

In some instances, the WMC device 102 may be utilized for non-communicative tasks. For example, the WMC device 102 may be utilized to create video, audio, and/or other types of multimedia data files. In order to provide convenient usability of generated and/or maintained multimedia data files, the WMC device 102 may create context data tags, which may be utilized to tag the multimedia data files. Context data tags may enable identifying multimedia data files without having to directly access the multimedia data files and/or examine the contents of the multimedia data files. For example, the WMC device 102 may be enabled to tag digital picture files while they are being generated or after the files have been generated. Rather than having to compare picture files based on their content (actually comparing pictures), the WMC device 102 may be utilized to create context data tags that may identify such picture files simply by reading these context data tags.

The context data tags may comprise information about the content of the multimedia data file and/or information that may help identify the multimedia data files. For example, a context data tag of a picture file may comprise information such as location, date, name of person(s) in the picture, information pertaining to a subject of the picture file, environment information, biometric information, and/or information pertaining to utilization of the WMC device 102 when the multimedia data file was generated and/or accessed. Therefore, when attempting to identify picture files, it may suffice to examine the corresponding context data tags rather having to open up and view each picture.

The location attribute may identify a location where a multimedia data file was created and/or accessed. For example, the location attribute in a context data tag of a digital picture may indicate that the picture was taken in New York City, and thus it may suffice to read out that information rather than having to view the content of the digital picture. The subject attribute may identify information pertaining to circumstances when a multimedia data file was created and/or accessed. For example, the subject attribute in a context data tag of a digital picture may indicate that the picture was taken during a business meeting. Such subject attribute may be derived from the contents of the multimedia data file itself, or it may be derived from other applications utilized in the WMC device 102 when the multimedia file was created and/or accessed. For example, calendar applications such as Microsoft Outlook® may be utilized, with other relevant information such as date and/or time information, to create a context data tag for a digital picture, which may indicate that the digital picture was taken during a business meeting with persons X and Y in New York City. Environment information may comprise information pertaining to environmental conditions that may have existed when the multimedia data file was generated and/or accessed. For example, the environmental information may comprise information such as temperature, humidity, and/or precipitation. Consequently, "raining" may be utilized as a distinguishing factor in a large class of digital picture for example. Information pertaining to utilization of the WMC device 102 may be utilized in context data tags. For example, settings of a digital camera utilized in generating digital pictures may be utilized in creating context data tags for digital pictures generated in the WMC device 102. These settings may comprise such information as use of panoramic view, focal length, and/or use of colors. The context data tags may be generated dynamically, wherein the context data tags are created contemporaneously with the creation and/or access of the multimedia data files.

In accordance with an embodiment of the invention, user preference information may be utilized in tagging operations. User preference information may be maintained within the WMC device 102. The WMC device 102 may utilize user preference information in generating the context data tags. The user preference information may comprise information that may be specific to a user of the WMC device 102. Notwithstanding, the invention may not be so limited and other criteria may be utilized. For example, the type of tags generated may be dependent on the time of day, location, an event, biometric information and/or other factors. The user preference information may enable determining one or more attributes that the user may prefer to be utilized in creating the context data tags. For example, user preference information may indicate that a user of the WMC device 102 prefers utilizing only subject and location attributes in creating context data tags for multimedia data files. Furthermore, user preference information may indicate that different attributes may be used for different types of multimedia data files. For example, user preference information may indicate that only subject/location attributes may be utilized to create context data tags for digital picture while context data tags for audio recordings may comprise subject, location, date/time, and scheduling attributes.

The WMC device 102 may utilize the remote device 104 to perform tagging operations for multimedia data files generated and/or maintained in the WMC device 102. For example, the remote device 104 may be enabled to perform tagging of multimedia data files substantially similar to the WMC device 102 as describe hereinbefore. In such scenarios, the WMC device 102 may transfer untagged multimedia data files generated and/or accessed in the WMC device 102 to the remote device 104. The remote device 104 may generate context data tags corresponding to the received multimedia data files, based on information derived from the content of the untagged data and/or user preference information, or based on tagging information sent from the WMC device 102 along with the untagged data. The remote device may then utilize the generated context data tags to tag the received multimedia data files. The remote device 104 may also be utilized to access user preference information. While user preference information may be stored directly in the WMC device 102, the user preference information may also be stored external to the WMC device 102, for example in the remote device 104. In such scenario, where the tagging operations may be performed in the WMC device 102, the WMC device 102 may retrieve the user preference information from the remote device 104 in order to perform the tagging operations.

Figure 2A:
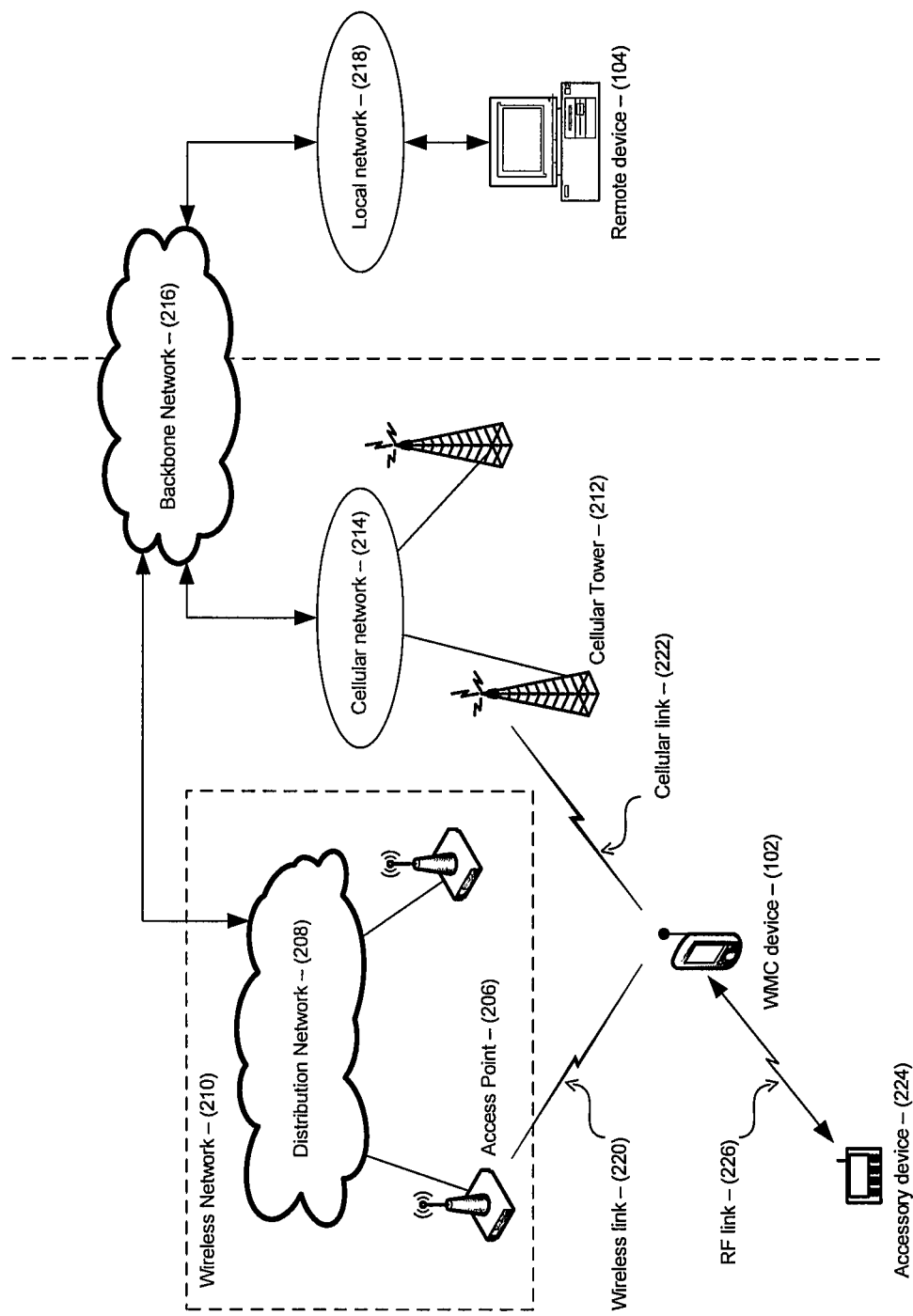
FIG. 2A is a block diagram that illustrates an exemplary model for setup that includes a wireless mobile communication (WMC) device and a remote device, which may utilize context data tags, in accordance with an embodiment of the invention.

FIG. 2A is a block diagram that illustrates an exemplary model for setup that includes a wireless mobile communication (WMC) device and a remote device, which may utilize context data tags, in accordance with an embodiment of the invention. Referring to FIG. 2A, there is shown the WMC device 102, the remote device 104, an access point 206, a distribution network 208, a wireless network 210, a cellular tower 212, a cellular network 214, a backbone network 216, a local network 218, a wireless link 220, a cellular link 222, an accessory device 224, and a RF link 226.

The wireless network 210 may comprise a plurality of the access point 206, the distribution network 208 and suitable logic, circuitry and/or code that may enable implementing a functional block corresponding to a wireless technology. Exemplary wireless technology may comprise for example the IEEE 802.11 (WLAN) or WiMAX (IEEE 802.16) architecture. The access point 206 may comprise suitable logic, circuitry, and/or code that may be utilized to provide the necessary access infrastructure for the WMC device 102 to access the wireless network 210. The distribution network 108 may comprise suitable logic, circuitry, and/or code that may be adapted to operate as a backbone network that may be responsible for transport and link functionality for a plurality of access points in the wireless network 210.

The cellular network 214 may comprise plurality of the cellular tower 212 or base stations, and suitable logic, circuitry and/or code that may enable implementing a functional block corresponding to a cellular technology. Exemplary cellular technology may comprise cellular technologies that enable data services, including but not limited to, CDMA, WCDMA, CDMA1000, HSDPA, GSM, GPRS, EDGE, and UMTS.

The accessory device 224 may comprise suitable logic, circuitry and/or code that may enable performing some accessory functionality in conjunction with the use of the WMC device 102. For example, the accessory device may comprise a hands-free headset. The WMC device 102 may interact with the accessory device 224 over a short-range RF link 226, for example. The RF link 226 may utilize, for example, a standardized technology for inter-device short range communication. For example, the RF link 226 may correspond to a Bluetooth® connection or ZigBee connection between the accessory device 224 and the WMC device 102.

The local network 218 may comprise suitable logic, circuitry and/or code that may enable local connectivity. This local connectivity may comprise use of Local Area Network (LAN) technologies that enable data services, including but not limited to, IEEE 802.3 Ethernet. Other technologies may comprise WLAN and/or WiMAX.

The backbone network 216 may comprise suitable logic, circuitry, and/or code that may be adapted to provide overall system connectivity between sub-networks. The backbone network 216 may be enabled to interact with, and connect different wired and/or wireless technologies. For example, the backbone network 216 may comprise a standard telephony network (POTS) that may enable data connectivity between different interface nodes linking wired and/or wireless networks comprising WLAN networks, WiMAX networks, cellular networks, and/or LAN networks.

In operation, the WMC device 102 may utilize the wireless link 220 to access the wireless network 210 via the access point 206. The WMC device 102 may also utilize the cellular link 222 to access the cellular network 214 via the cellular tower 212. The WMC device 102 may attempt to communicate with the remote device 104 via the wireless network 210 through the access point 206 and the distribution network 208. The distribution network 208 may enable forwarding messages and/or data sent from, and to the WMC device 102. The backbone network 216 may enable connectivity between local networks, for example wireless network 210, and cellular network 214. The remote device 104 may receive communication from the WMC device 102 by interacting with the backbone network 216. Necessary protocol-based operations may be performed to facilitate the transmission of information through all the different components. This may comprise use of exemplary protocols such as IP and SS7.

Once the WMC device 102 establishes connection with the remote device 104, the WMC device 102 may utilize the remote device 104 in operations pertaining to multimedia data files substantially as described in FIG. 1. The WMC device 102 may utilize context data tags corresponding to multimedia data files created and/or maintained in the WMC device 102. Alternatively, tagging operations may be performed in the remote device 104 after the multimedia data files are transferred from the WMC device 102 to the remote device 104, substantially as described in FIG. 1. User preference information may be utilized in tagging multimedia data files. User preference information may comprise attributes that are preferred for tagging multimedia data files. While user preference information may be stored directly in the WMC device 102, the user preference information may also be stored external to the WMC device 102, for example in the remote device 104. The WMC device 102 may retrieve the user preference information from the remote device 104 while performing tagging operations.

Figure 2B:
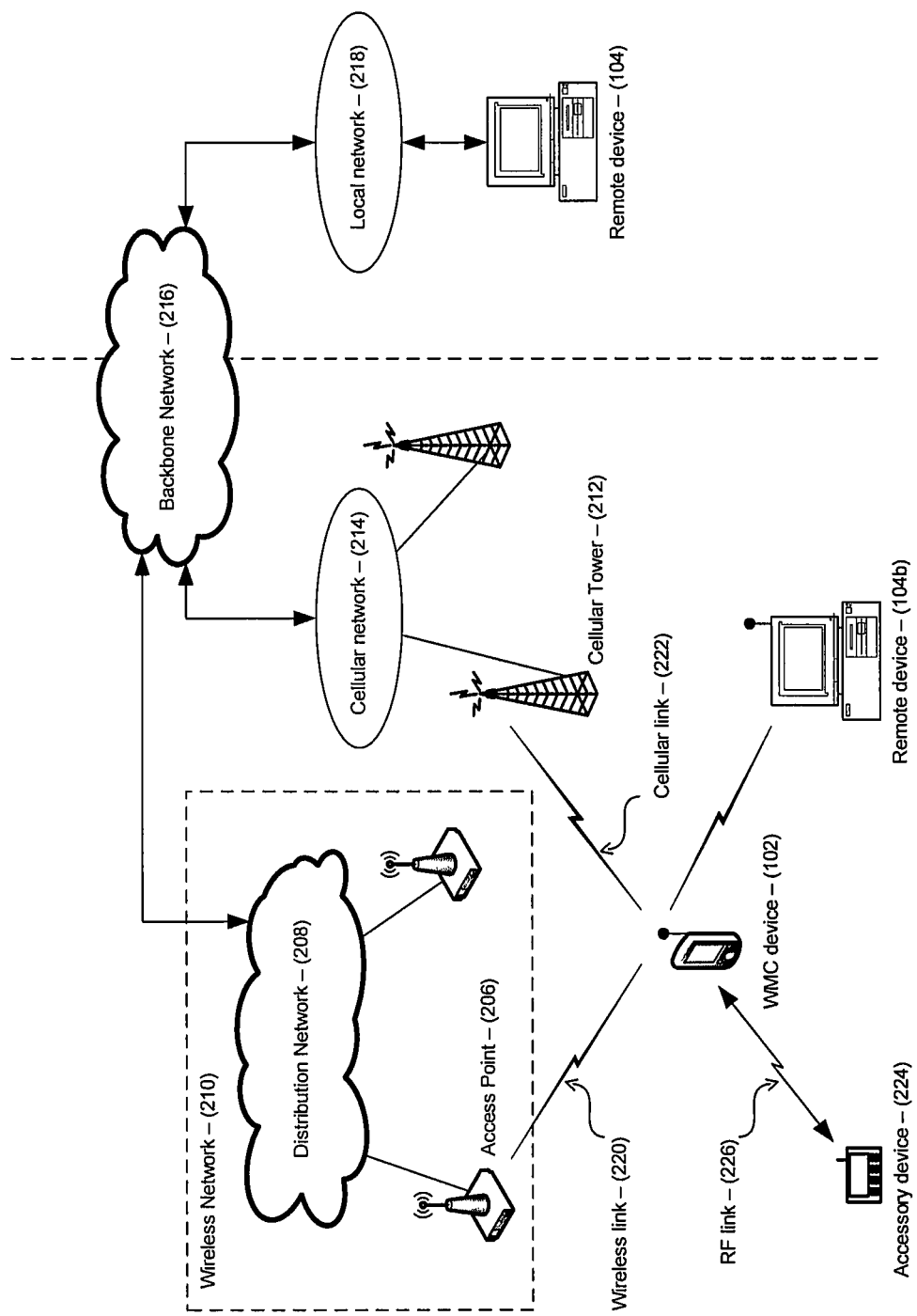
FIG. 2B is a block diagram that illustrates an exemplary model for setup that includes a wireless mobile communication (WMC) device communicating directly with a remote device, which may utilize context data tags, in accordance with an embodiment of the invention.

FIG. 2B is a block diagram that illustrates an exemplary model for setup that includes a wireless mobile communication (WMC) device communicating directly with a remote device, which may utilize context data tags, in accordance with an embodiment of the invention. Referring to FIG. 2B, there is shown the WMC device 102, the remote device 104, the access point 206, the distribution network 208, the wireless network 210, the cellular tower 212, the cellular network 214, the backbone network 216, the wireless link 220, the cellular link 222, the accessory device 224, the RF link 226, and a remote device 104b.

The remote device 104b may be similar to the remote device 104. However, the remote device 104b may also comprise suitable logic, circuitry, and/or code that may enable wireless connectivity. The WMC device 102 may communicate directly with the remote device 104b via a wireless connection.

In operation, the WMC device 102, the remote device 104, the access point 206, the distribution network 208, the wireless network 210, the cellular tower 212, the cellular network 214, the backbone network 216, the accessory device 224, and the RF link 226 may operate similar to FIG. 2A. The remote device 104b may operate similar to the remote device 104 as described in FIG. 1 and FIG. 2A. However, the WMC device 102 may communicate directly with the remote device 104b over a wireless connection. The remote device 104b may be operated as a stand-alone device, or it may be operated within a compatible network, wherein the remote device may be integrated. The ability to communicate directly with the remote device 104b may allow improved utilization of the remote device 104b by the WMC device 102. The direct wireless connection between the WMC device 102 and the remote device 104b may enable faster and more reliable communication between the two devices. The improvement may be due to the characteristics of the wireless connection between the remote device 104b and the WMC device 102, for example having greater bandwidth. The improvement may also be due to reduced delays compared to setups where the WMC device 102 may have to communicate with the remote device 104 through a plurality of connecting networks and/or entities.

Once the WMC device 102 establishes connection with the remote device 104b, the WMC device 102 may utilize the remote device 104b in operations pertaining to multimedia data files substantially as described in FIG. 1 and FIG. 2A. The remote device 104b may be utilized to perform tagging of multimedia data files, generated and/or accessed in the WMC device 102, and the remote device 104b may utilize context data tags to perform such tagging, substantially as described in FIG. 1 and FIG. 2A. User preference information may be utilized for tagging multimedia data files, and it may comprise one or more attributes that are preferred for performing any such tagging. The user preference information may be stored in the remote device 104b, and may be utilized in the remote device 104b, or may be transferred to the WMC device 102 to facilitated performing tagging operations in the WMC device 102.

Figure 3:
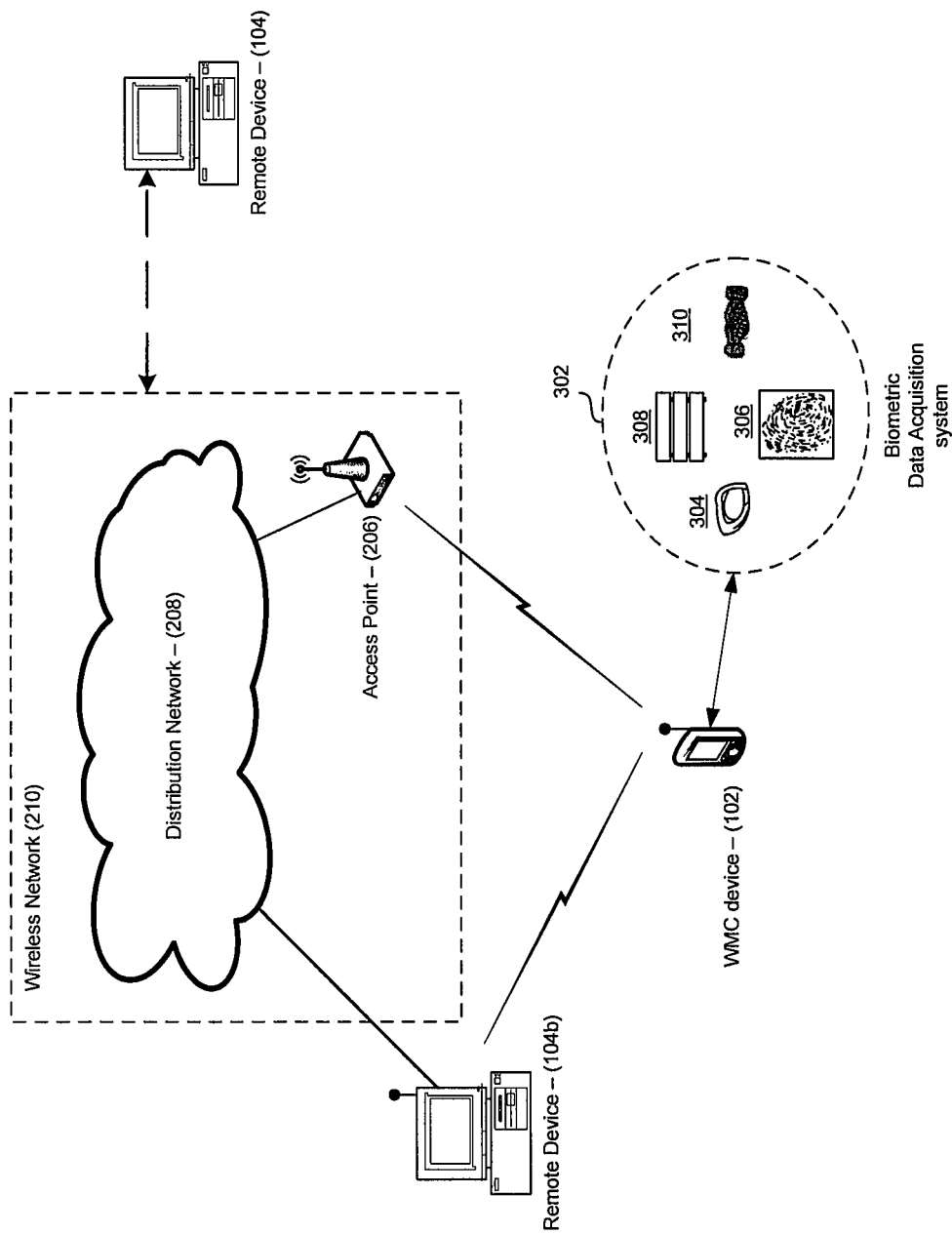
FIG. 3 is a block diagram illustrating a wireless mobile communication (WMC) device utilizing biometric data, in accordance with an embodiment of the invention.

FIG. 3 is a block diagram illustrating a wireless mobile communication (WMC) device utilizing biometric data, in accordance with an embodiment of the invention. Referring to FIG. 3, there is shown the wireless mobile communication (WMC) device 102, the access point 206, the distribution network 208, the wireless network 210, the remote device 104, the remote device 104b, and a biometric data acquisition system 302.

The biometric data acquisition system 302 may comprise a biometric sensor 304, acquired biometric data 306 (from user), a pattern recognition database 308, an authentication and validation procedure 310, and suitable logic, circuitry and/or code that may enable performing biometric validation and modification procedures. Biometric data, which may comprise finger prints, retina data, or behavioral patterns, may be unique to a person. Biometric data may be classified into two main types: physiological and behavioral biometric data. The physiological biometric data may be related to the physical aspect of the body such as facial features, finger prints, hand shape, iris blood vessel pattern (iris scan) and DNA sequences. The behavioral biometric data may be related to the expression of personality such as Electroencephalogram (EEG) that senses and measures brain wave activities, signature, hand writing and voice. Therefore the biometric data may be representative of the actual person or user.

The biometric sensor 304 may comprise suitable logic, circuitry and/or code that may enable acquiring user's biometric data in the course of his or her use of the WMC device 102. An example of the biometric sensor 304 may be a finger print scanner, an iris scanner, hand scanner, brain wave electrodes or a voice analyzer. The acquired biometric data 306 may comprise biometric data acquired by the biometric sensor 304 from the user's prior use of the WMC device 102. For example, the acquired biometric data 306 may comprise the user's finger prints, iris scan, voice pattern, and/or behavioral patterns. The pattern recognition database 308 may comprise suitable logic, circuitry and/or code that may enable storing the acquired biometric data 306. The authentication and validation procedure 310 may comprise suitable logic, circuitry and/or code that may enable authenticating biometric data read during the use of the WMC device 102 by comparing the read data against the acquired biometric data 306 stored in, and retrieved from the pattern recognition database 308.

In operation, the WMC device 102 may communicate with the remote device 104b via the wireless network 210 by accessing the distribution network 208 through the access point 206. The WMC device 102 may also communicate directly with the remote device 104b over a wireless connection. Alternatively, the WMC device 102 may utilize the wireless network 210 to communicate with the remote device 104 substantially similar to FIG. 1. Once the WMC device 102 establishes communication with remote devices 104 and/or 104b, the WMC device 102 may utilize the devices for tagging multimedia data files, and/or for retrieving user preference information substantially as described in FIG. 1, FIG. 2A, and FIG. 2B. The WMC device 102 and/or the remote devices 104 and/or 104b may utilize context data tags for tagging multimedia data files that may be generated and/or maintained in the WMC device 102. User preference information may be utilized to tag multimedia data files wherein said user preference information may comprise preferred attributes that may be utilized in creating the context data tags. The user preference information may be stored and/or maintained in the WMC device 102 and/or the remote devices 104 and/or 104b.

The biometric data acquisition system 302 may be utilized in tagging multimedia data files. Biometric data that may be generated via the biometric data acquisition system 302 may be utilized independently and/or in conjunction with user preference information in creating context data tags for multimedia data files generated and/or maintained in the WMC device 102. For example, the WMC device 102 may utilize voice recognition techniques to identify an audio file created by the WMC device 102 user by creating a context data tag that may comprise the names of persons in the audio files that may be recognized based on their voices. The WMC device 102 may utilize behavioral pattern recognition to ascertain and/or predict specific parameters based on user preference information. For example, the WMC device 102 may utilize behavioral pattern recognition techniques to predict that certain actions performed on the WMC device 102 at certain times, dates, and/or locations correlate to some specific activity that may be personal, business, or leisure in nature. Such knowledge may then be utilized in create different context data tags that correspond to these different preferences. For example, user preference information may specify that only data generated and/or accessed during business meetings need have subject attributes in the corresponding context data tags. Behavioral pattern recognition techniques may then be utilized to determine, based on EEG readings for example, which multimedia data files were generated in the course of business-related activities, and therefore, these multimedia data files would be tagged with context data tags that may comprise subject attributes as specified in the user preference information.

Figure 4:
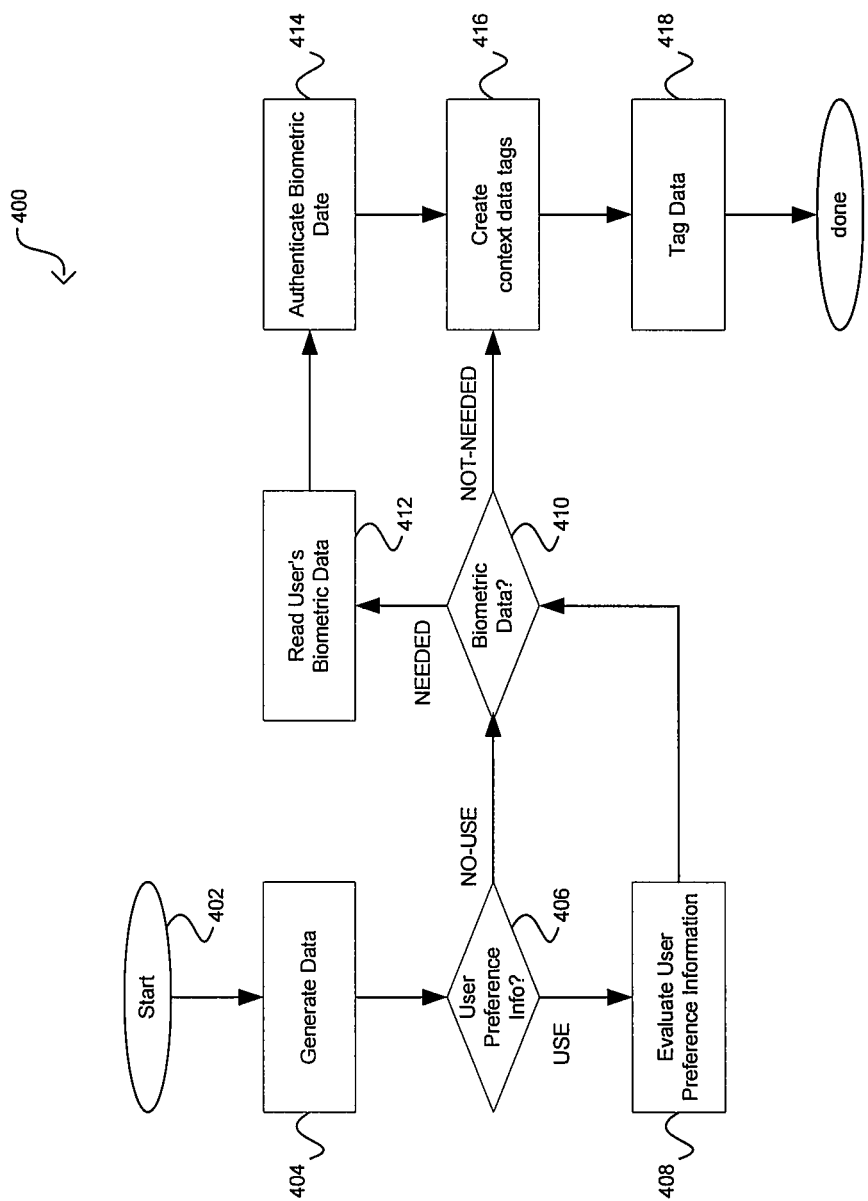
FIG. 4 is a flow diagram that illustrates use of context data tags in data tagging in wireless system, in accordance with an embodiment of the invention.

FIG. 4 is a flow diagram that illustrates use of context data tags in data tagging in wireless system, in accordance with an embodiment of the invention. Referring to FIG. 4, there is shown a flow chart 400. In step 402, the process starts. The WMC device 102 may be utilized for performing some task which may be a non-communicative task. For example, the WMC device 102 may be utilized in a way that is substantially similar to a digital camera and/or an audio recorder. In 404, multimedia data files may be generated and/or modified in the WMC device 102. For example, the WMC device 102 may be utilized to create a multimedia data file, which may comprise an audio clip, a video clip, a digital picture, and/or other possible outcomes of performing jobs on the WMC device 102. The process may then proceed to step 406.

In step 406, a determination whether to utilize user preference information may be performed. In the instance that the outcome of the determination in step 406 is "NO-USE," the user preference information need not be utilized, and the process may proceed to step 410. In the instance that the outcome of the determination in step 406 is "USE," the process may proceed to step 408. In step 408, user preference information may be evaluated for tagging multimedia data files generated and/or modified in step 404. Because user preference information may not be stored within the WMC device 102, the user preference information may have to be transferred into the WMC device 102. User preference information may comprise information that may enable determining any attributes that may be utilized and/or may be preferred in creating context data tags. For example, user preference information may enable determining that only location and time stamps may be utilized in tagging digital pictures generated and/or modified in the WMC device 102 during business-related activities.

In step 410, a determination of whether biometric data is necessary may be performed. This may be necessary because some attributes utilized in creating context data tags may require utilizing the biometric system 302. For example, based on user preference information, it may be determined that context data tags may comprise information pertaining to the nature of a job and/or activity performed while creating multimedia data file. Consequently, EEG readings may be utilized, via the biometric system 302, to determine whether the activity performed when creating the multimedia data files was business-related or leisure-related. In instances where it may be determined in step 410 that biometric data may not be needed, the process may proceed to step 416. In instances where it may be determined in step 410 that biometric data may be needed, the process may proceed to step 412. In step 412, the WMC device 102 user's biometric information may be read. This may comprise utilizing the biometric data acquisition system 302 substantially as described with respect to FIG. 3. In step 414, an authentication and validation procedure 310 of the read biometric data may be performed. The outcome of the authentication and validation procedure may be utilized in situations where security is an important factor. For example, where tagging certain multimedia data files maintained and/or accessed in the WMC device 102 may be limited exclusively to the user. In situations where authentication and validation may not be needed, the authentication and validation procedures in step 414 may not be performed.

In step 416, a context data tag may be created for the generated data. The context data tag is a tag that may improve usability of the generated data by making identification of data more convenient. The context data tag may comprise such information as time and/or date stamp, location stamp, which may be ascertained using such application as GPS services, and other information that may be derived from the user preference information. User preference information may enable ascertaining the context of the use of the WMC device 102 to generate the data; for example, whether the WMC device 102 use pertains to business or personal purpose. In step 418, the context data tags generated in step 416 may be utilized to tag the multimedia data files wherein context data tags are designated as identifying tags for corresponding multimedia data files.

Various embodiments of the invention may comprise a method and system for tagging data with context data tags in a wireless system. The WMC device 102 may be utilized to generate and/or maintain multimedia data files. Context data tags may be created to tag the generated multimedia data files, enabling identification of multimedia data files without directly accessing the multimedia data files. Context data tags may comprise such attributes as time/date stamps, location, subject, environment, scheduling, and/or biometric information. The WMC device 102 may maintain user preference information, which is unique to the WMC device capabilities and/or to a specific device user. The user preference information may be utilized to specify attributes that may be utilized in creating context data tags for multimedia data files. The user preference information may be maintained in the WMC device 102 and/or externally. Tagging operations may be performed dynamically, and the remote device 104 may be utilized to perform tagging operations and/or to maintain the user preference information.

Another embodiment of the invention may provide a machine-readable storage, having stored thereon, a computer program having at least one code section executable by a machine, thereby causing the machine to perform the steps as described herein for tagging data with context data tags in a wireless system.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed:

1. A method for handling data in wireless devices, the method comprising:
    identifying data that is at least one of generated or maintained in a wireless mobile communication device;
    generating a context data tag according to biometric information received from a biometric sensor;
    tagging said data with said context data tag based on user preference information, wherein said user preference information is specific to a particular user and said user preference information specifies one or more attributes associated with said particular user for controlling said generation of said context data tag.

2. The method according to claim 1, wherein said user preference information is stored in said wireless mobile communication device.

3. The method according to claim 1, wherein at least a portion of said user preference information is stored external to said wireless mobile communication device.

4. The method according to claim 1, comprising performing at least a portion of said tagging external to said wireless mobile communication device.

5. The method according to claim 1, comprising performing said tagging dynamically in response to said generation of said data.

6. The method according to claim 1, wherein said one or more attributes enable said identifying said data based on at least one of contents of said data conditions pertaining to at least one of said generation or maintenance of said data.

7. The method according to claim 6, wherein said one or more attributes comprise at least one of time, date, location, subject, scheduling, environment, or biometric information.

8. The method according to claim 6, comprising utilizing at least one of an operation, an application, or an accessory device to derive said one or more attributes.

9. The method according to claim 1, wherein said user preference information comprises an indication to use at least one of time or date stamping associated with said data.

10. The method according to claim 1, wherein said user preference information comprises an indication to use location stamping associated with location of said wireless mobile communication device during at least one of said generation or maintenance of said data.

11. The method according to claim 10, wherein said location stamping is based on Global Positioning System (GPS) location, wherein said generating said context data tag comprises generating said context data tag according to said GPS location.

12. The method according to claim 1, wherein said user preference information comprises an indication to use at least one of calendar or scheduling information, wherein said generating said context data tag comprises generating said context data tag according to at least one of said calendar or said scheduling information.

13. A system, the system comprising:
    at least one processor utilized in a wireless mobile communication device that identifies data that is at least one of generated or maintained in said wireless mobile communication device;
    said at least one processor that generates a context data tag according to biometric information received from a biometric sensor; and said at least one processor that enables tagging said data with said context data tag based on user preference information, wherein said user preference information is specific to a particular user and said user preference information specifies one or more attributes associated with said particular user for controlling of said generation of said context data tag.

14. The system according to claim 13, wherein said user preference information is stored in said wireless mobile communication device.

15. The system according to claim 13, wherein at least a portion of said user preference information is stored external to said wireless mobile communication device.

16. The system according to claim 13, wherein said at least one processor enables performing at least a portion of said tagging external to said wireless mobile communication device.

17. The system according to claim 13, wherein said at least one processor enables performing said tagging dynamically in response to said generation of said data.

18. The system according to claim 13, wherein said one or more attributes enable said at least one processor to identify said data based on at least one of contents of said data or conditions pertaining to at least one of said generation or maintenance of said data.

19. The system according to claim 18, wherein said one or more attributes comprise at least one of time, date, location, subject, scheduling, environment, or biometric information.

20. The system according to claim 18, wherein said at least one processor enables utilizing at least one of an operation, an application, or an accessory device to derive said one or more attributes.

21. The system according to claim 13, wherein said user preference information comprises an indication to use at least one of time or date stamping associated with said data.

22. The system according to claim 13, wherein said user preference information comprises an indication to use location stamping associated with location of said wireless mobile communication device during at least one of said generation or maintenance of said data.

23. The system according to claim 22, wherein said location stamping is based on Global Positioning System (GPS) location, wherein said at least one processor is operable to generate said context data tag according to said GPS location.

24. The system according to claim 13, wherein said user preference information comprises an indication to use calendar and/or scheduling information, wherein said at least one processor is operable to generate said context data tag according to at least one of said calendar or said scheduling information.

25. A system comprising:
a wireless communication device comprising
circuitry that identifies data generated in said wireless communication device;
circuitry that generates a context data tag according to biometric information received from a biometric sensor; and
circuitry that enables tagging said data with said context data tag based on user preference information, wherein said user preference information is specific to a particular user and said user preference information specifies one or more attributes associated with said particular user to control said generation of said context data tag.

26. The system of claim 25, wherein the biometric data comprises at least one of fingerprint data, retina data, a behavioral pattern, iris scan data, or brain wave data.

* * * * *